A. T. Ballantine.
Sugar Crusher.
N° 30,516. Patented Oct. 23, 1860.
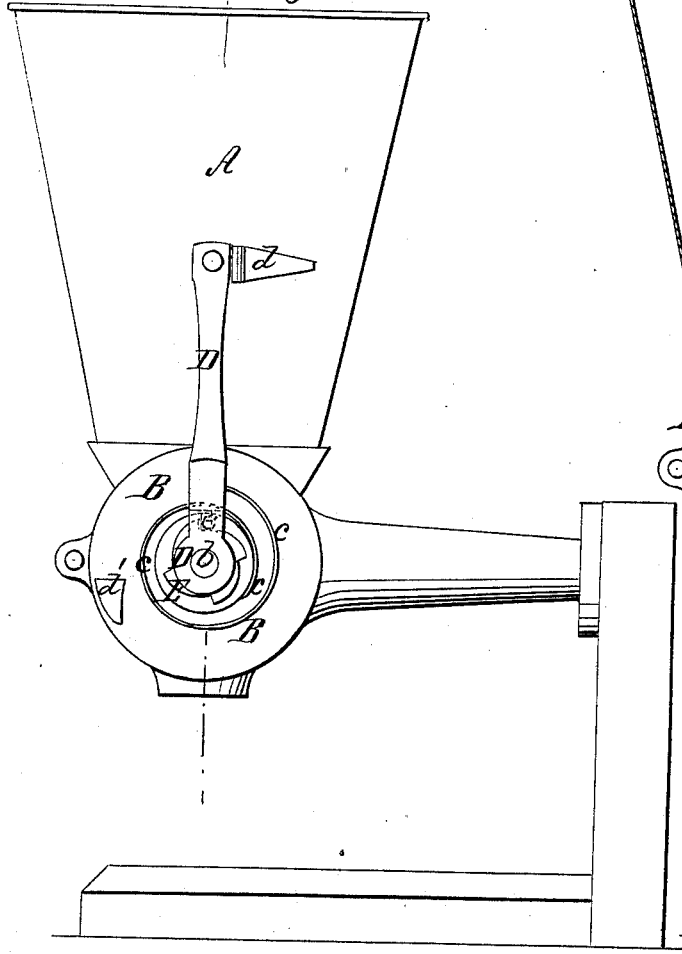
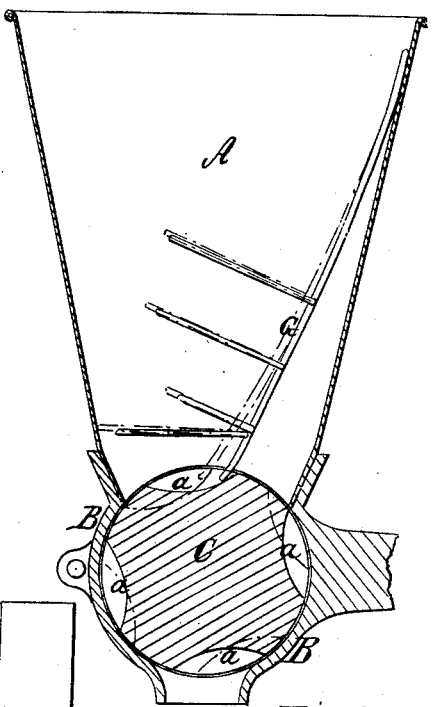
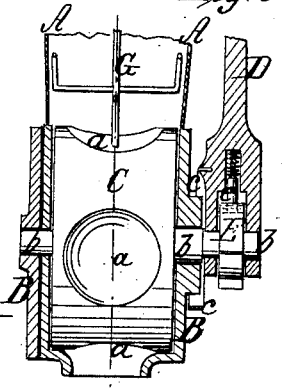
Witnesses;
J. W. Coombs,
C. S. Spencer
Inventor;
A. T. Ballantine

UNITED STATES PATENT OFFICE.

A. T. BALLANTINE, OF NEW YORK, N. Y., ASSIGNOR TO HIMSELF AND T. O. CONKLING, OF SAME PLACE.

IMPROVED BOX FOR DROPPING SUGAR.

Specification forming part of Letters Patent No. 30,516, dated October 23, 1860.

*To all whom it may concern:*

Be it known that I, A. T. BALLANTINE, of the city, county, and State of New York, have invented a new and useful Sugar-Box; and I do hereby declare that the following is a full, clear, and exact description of the same, reference being had to the accompanying drawings, making a part of this specification, in which—

Figure 1 is a side elevation of the improved sugar-box. Figure 2 is a section through the machine, showing the dropping device and agitator. Fig. 3 is a sectional view of that portion of the machine containing the dropping-wheel, showing the manner of rotating it.

Similar letters of reference indicate corresponding parts in the three figures.

This invention is intended for the use of hotels, saloons, and other places where sugar is used in large quantities and dealt out in small quantities—as, for instance, in sweetening liquors, &c. Its object is to furnish a means of obtaining a certain quantity of sugar more rapidly than can be done by using a spoon.

The invention consists in arranging at the bottom of a hopper of any desirable shape or capacity a discharging device, which will be hereinafter described, whereby a definite quantity of sugar will be discharged from the hopper by the movement of a lever suitably applied to the box.

It further consists in the employment of a wire agitator, which is operated by the dropping device, so as to keep the sugar loose in the hopper and prevent it from clogging up the throat of said hopper, all as will be hereinafter described.

To enable those skilled in the art to fully understand my invention, I will proceed to describe its construction and operation.

A is a hopper with inclined sides, to the bottom of which is suitably attached a circular box, B, into which is fitted a wheel, C, having concave depressions $a$ $a$ in its periphery, which are at equal distances apart around the wheel. The bottom of box B is open to allow the sugar to drop from the cups $a$ in the wheel into a vessel placed under the box. A shaft, $b$, passes through the wheel C, is keyed to it, and has its bearings in the center of such side of the box B. One end of this shaft $b$ projects some distance from one side of the box, and receives a forked lever, D, which is acted upon by a spring, $c$, and a ratchet-wheel, E, that is keyed to the shaft between the forked ends of the lever D. The spring $c$ holds the lever D, which is placed loosely on its shaft against a stop, $d$, on one side of the hopper A in a position ready for operating the wheel C. A spring-pawl pin, $e$, is placed in the lower end of the lever D, so that by moving this lever from stop $d$ to stop $d'$ on the box B the pin $e$ will give a quarter-turn to the wheel C, and bring one of its cups $a$ opposite the hole in the bottom of box B. When the lever D is released the spring $c$ returns it to the stop $d$ again, and the pin $e$ engages with another tooth on the ratchet-wheel E, ready to again move the wheel C another quarter-revolution, thus at each full movement of the lever the one of the cups $a$ in the surface of wheel C is brought over the orifice in the bottom of box B, which orifice is equal in diameter to that of the cups $a$, as shown in the sectional drawings, Figs. 2 and 3. On one side, inside of the hopper A, is fixed a wire frame, G, one end of which is soldered or otherwise attached to the hopper, and the other end rests on the periphery of wheel C. The wire should be enameled, so that the cups $a$ will give a quick vibrating motion to this frame as the wheel C is rotated. The frame G is made up of a number of short branching wires, which, in their quick striking motion, will loosen the sugar, which is placed in the hopper, and prevent the sugar from clogging up in the throat of the hopper.

This machine is suitably mounted, and it will be seen that the hopper and box B with its lever D may be made of any desirable shape or design, and ornamented in a style that will present a neat and handsome appearance.

Having thus described my invention, what I claim as new, and desire to secure by Letters Patent, is—

1. The combination, with a suitable hopper, A, of a rotating dropping-wheel, C, spring $c$, lever D, pawl $e$, and ratchet-wheel or their equivalents, arranged and operating as and for the purposes herein set forth.

2. The vibrating wire frame G, placed within the hopper A, and operating as and for the purposes herein set forth.

A. T. BALLANTINE.

Witnesses:
J. W. COOMBS,
R. S. SPENCER.